(12) United States Patent
Bolte et al.

(10) Patent No.: US 12,240,507 B2
(45) Date of Patent: Mar. 4, 2025

(54) MID OF TRAIN UNIT

(71) Applicant: Siemens Mobility, Inc., New York, NY (US)

(72) Inventors: Matthew Bolte, St. Michael, MN (US); Mario Fernandes, Jacksonville, FL (US)

(73) Assignee: SIEMENS MOBILITY, INC., New York, NY (US)

( * ) Notice: Subject to any disclaimer, the term of this patent is extended or adjusted under 35 U.S.C. 154(b) by 723 days.

(21) Appl. No.: 17/643,228

(22) Filed: Dec. 8, 2021

(65) Prior Publication Data
US 2022/0097743 A1 Mar. 31, 2022

Related U.S. Application Data

(63) Continuation-in-part of application No. 16/480,187, filed as application No. PCT/US2017/014847 on Jan. 25, 2017, now abandoned.

(51) Int. Cl.
| B60T 13/66 | (2006.01) |
| B60T 17/22 | (2006.01) |
| B61C 17/12 | (2006.01) |
| B61L 15/00 | (2006.01) |

(52) U.S. Cl.
CPC ....... B61L 15/0063 (2013.01); B61L 15/0018 (2013.01)

(58) Field of Classification Search
CPC .... B60T 13/665; B60T 17/221; B60T 17/228; B61C 17/12; B61L 15/0027; B61L 15/0054
See application file for complete search history.

(56) References Cited

U.S. PATENT DOCUMENTS

| 5,681,015 A * | 10/1997 | Kull | B61L 15/0081 246/167 R |
| 6,227,625 B1 * | 5/2001 | Gaughan | B61L 15/0027 73/39 |
| 6,236,185 B1 * | 5/2001 | Hines | H02J 7/32 320/101 |
| 9,902,412 B2 * | 2/2018 | Fernandes | B60T 8/1705 |
| 2010/0130124 A1 * | 5/2010 | Teeter | B61L 15/0027 455/15 |
| 2014/0263860 A1 * | 9/2014 | Iden | B61C 17/12 246/187 A |

(Continued)

FOREIGN PATENT DOCUMENTS

BR 112019015229 B1 * 6/2023 ............ B60T 13/665

*Primary Examiner* — Jason C Smith

(57) ABSTRACT

A mid of train (MOT) mobile unit for use with a train is provided. The MOT mobile unit comprises a first hose for mounting the MOT mobile unit between first and second railway cars of the train located near a middle of the train and a radio for communications with an end of train (EOT) unit disposed on one end of the train and for communications with a head of train (HOT) unit disposed on other end of the train. With the first radio, the MOT mobile unit provides a repeater device functionality for communicating between the EOT unit and the HOT unit. The MOT mobile unit is configured to receive a power from a brake line of the train that runs a length of the train, wherein the power is derived from a compressed air in the brake line by means of an air-powered generator that recharges a battery.

20 Claims, 9 Drawing Sheets

(56) References Cited

U.S. PATENT DOCUMENTS

| | | | |
|---|---|---|---|
| 2019/0366998 A1* | 12/2019 | Bolte | B60T 13/665 |
| 2022/0097743 A1* | 3/2022 | Bolte | B60T 13/665 |
| 2023/0063525 A1* | 3/2023 | Fernandes | B61L 15/0027 |

\* cited by examiner

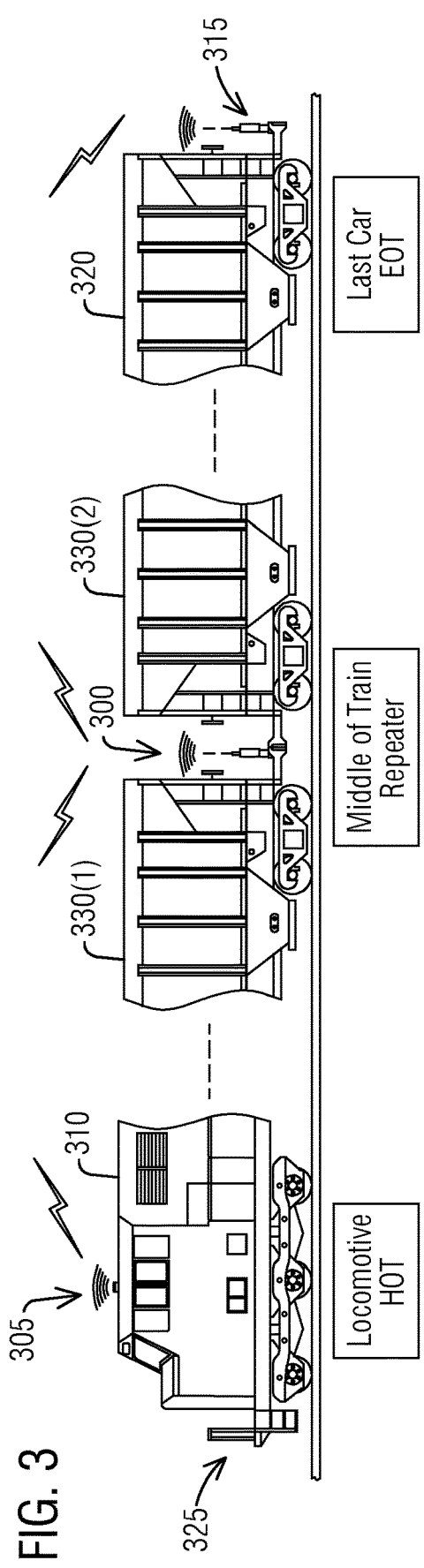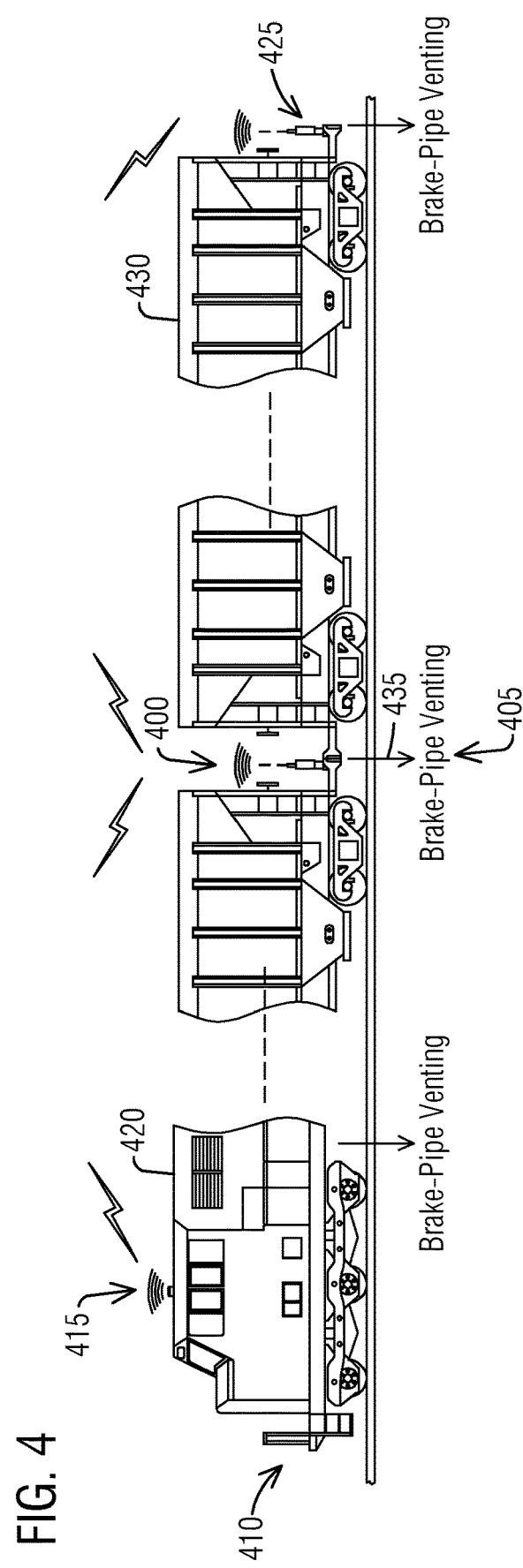

MID OF TRAIN UNIT

BACKGROUND

1. Field

Aspects of the present invention generally relate to a mid of train (MOT) mobile unit for a train and more specifically relate to installing the MOT mobile unit on a middle of a train to provide a repeater device functionality for communicating between an end of train (EOT) unit and a head of train (HOT) unit.

2. Description of the Related Art

Train consists may be configured with one or more locomotives and one or more cars. Various train lines are owned and operated by different railroad companies. Each railroad company uses a selected locomotive-train operating control system for controlling the trains of its fleet.

An end of train device (ETD) sometimes referred to as an (EOT), flashing rear-end device (FRED) or sense and brake unit (SBU) is an electronic device mounted on the end of freight trains in lieu of a caboose. They are divided into three categories: "dumb" units, which only provide a visible indication of the rear of the train with a flashing red taillight; "average intelligence" units with a brake pipe pressure gauge; and "smart" units, which send back data to the crew in the locomotive via radio-based telemetry. They may include complete End of Train Air System (ETAS) or Sense and Brake Unit (SBU) devices. A "dumb" EOT can be as simple as a red flag attached to the coupler on the last car of the train, whereas "smart" devices monitor functions such as brake line pressure and accidental separation of the train using a motion sensor, functions that were previously monitored by a crew in the caboose. The EOT transmits data via a telemetry link to a Head-of-Train device (HOT) device located in the locomotive.

A typical head-of-train (HOT) device displays the current brake line pressure on the rear end. The head-of-train (HOT) device, when used with an End-of-Train (EOT) device, provides the locomotive engineer with important information regarding the operation of the train. These conditions include brake pipe pressure (PSI) and various status conditions. The HOT also processes EOT/HOT communications tests, arm requests, and emergency brake commands resulting from an emergency switch activation or external emergency input.

Today trains are longer than they have ever been. One problem that the customer is facing because of the long trains is having a head of train (HOT) device talk to an end of train (EOT) device. They currently use wayside repeaters that are located in a wayside location or the HOT/Repeater that is mounted on a locomotive that is located in the middle of the train length which is also known as distributive power. By using wayside repeaters or a head of train (HOT) device mounted on the locomotive while the train is running on distributed power the issue of longer trains is addressed currently. This solution is not adequate for customers not wanting to use wayside repeaters and for customers not running Distributed Power trains with the specific configuration where a locomotive is placed in the middle of the train. Moreover, with the train lengths are being longer than ever and the customers not wanting wayside repeaters the head of train (HOT) device cannot properly talk to the end of train (EOT) device.

Therefore, there is a need for a way so that a head of train (HOT) device can talk to an end of train (EOT) device on longer trains.

SUMMARY

Briefly described, aspects of the present invention relate to a mid of train (MOT) mobile unit configured to be installed near a middle of a train to provide a repeater device functionality for communicating between an end of train (EOT) unit and a head of train (HOT) unit. By using a MOT mobile unit that is set in the middle of the train, it will eliminate the need of Railroads having to run distributive power with a locomotive located in the middle of the train and also allow them to put the repeater on the train where it is supposed to be. The Mid of Train unit or MOT is a mobile unit that can be removed and placed on a different train when needed. The MOT mobile unit receives its power from a break line and attaches onto a car set at the coupler, frame, or ladder. This MOT mobile unit may have a telescopic antenna that will be able to reach above the car sets to aid in the communication between the HOT unit and the EOT unit.

In accordance with one illustrative embodiment of the present invention, a mid of train (MOT) mobile unit is provided for use with a train. The MOT mobile unit comprises a first hose for mounting the MOT mobile unit between first and second railway cars of the train located near a middle of the train. The MOT mobile unit further comprises a first radio for communications with an end of train (EOT) unit disposed on one end of the train and a second radio for communications with a head of train (HOT) unit disposed on other end of the train. With the first and second radios jointly the MOT mobile unit provides a repeater device functionality for communicating between the EOT unit and the HOT unit.

In accordance with another illustrative embodiment of the present invention, a mid of train (MOT) mobile unit is provided for use with a train. The MOT mobile unit comprises a pass-through T-hose for mounting the MOT mobile unit between first and second railway cars of the train located near a middle of the train such that the MOT mobile unit is user configurable with the pass-through t-hose to operate as the MOT mobile unit instead of an end of train (EOT) unit. The MOT mobile unit further comprises a single end-hose to couple to a last car of the train such that the MOT mobile unit is user configurable with the single end-hose to operate as the EOT unit instead of the MOT mobile unit. The MOT mobile unit further comprises a first radio for communications with an end of train (EOT) unit disposed on one end of the train and a second radio for communications with a head of train (HOT) unit disposed on other end of the train. With the first and second radios jointly the MOT mobile unit provides a repeater device functionality for communicating between the EOT unit and the HOT unit.

In accordance with another illustrative embodiment of the present invention, a mid of train (MOT) mobile unit is provided for use with a train. The MOT mobile unit comprises a first hose for mounting the MOT mobile unit between first and second railway cars of the train located near a middle of the train. The MOT mobile unit further comprises a radio for communications with an end of train (EOT) unit disposed on one end of the train and for communications with a head of train (HOT) unit disposed on other end of the train. With the radio, the MOT mobile unit provides a repeater device functionality for communicating between the EOT unit and the HOT unit. The MOT mobile unit is configured to receive a power from a brake line of the train that runs a length of the train, wherein the power is derived from a compressed air in the brake line by means of an air-powered generator that recharges a battery.

BRIEF DESCRIPTION OF THE DRAWINGS

FIG. 3 illustrates a schematic of a MOT mobile unit as a train-based solution to bridge communications between a HOT device installed in the locomotive and an EOT device installed on a last car in accordance with an exemplary embodiment of the present invention.

FIG. 4 illustrates a schematic of a MOT mobile unit with brake-pipe venting in the middle of the train to bridge communications between a HOT device installed in the locomotive and an EOT device installed on a last car in accordance with an exemplary embodiment of the present invention.

DETAILED DESCRIPTION

To facilitate an understanding of embodiments, principles, and features of the present invention, they are explained hereinafter with reference to implementation in illustrative embodiments. In particular, they are described in the context of being a mid of train (MOT) mobile unit for use with a train to bridge communications between a head of train (HOT) device installed in a locomotive and an EOT device installed on a last car of the train. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

Adequate communications between a HOT device installed in the locomotive and an EOT device installed on a last car are possible for train lengths up to 2 miles. However, railroad companies wish to run longer trains. Current HOT-EOT communication capability is no longer adequate with communication failures happening and causing train stops, delays and schedule disruptions. Therefore, for longer trains such as freight trains without a caboose there is a need for at least one MOT mobile unit on every train and depending on the length of the train may be two or more. A MOT mobile unit enables a Head of Train (HOT) unit talk to an End of Train (EOT) unit by providing a mobile repeater device that is set near the middle of the train. The MOT mobile unit bridges communications between the HOT unit installed in a locomotive of the train and the EOT unit installed on a last car of the train.

Figure 1:
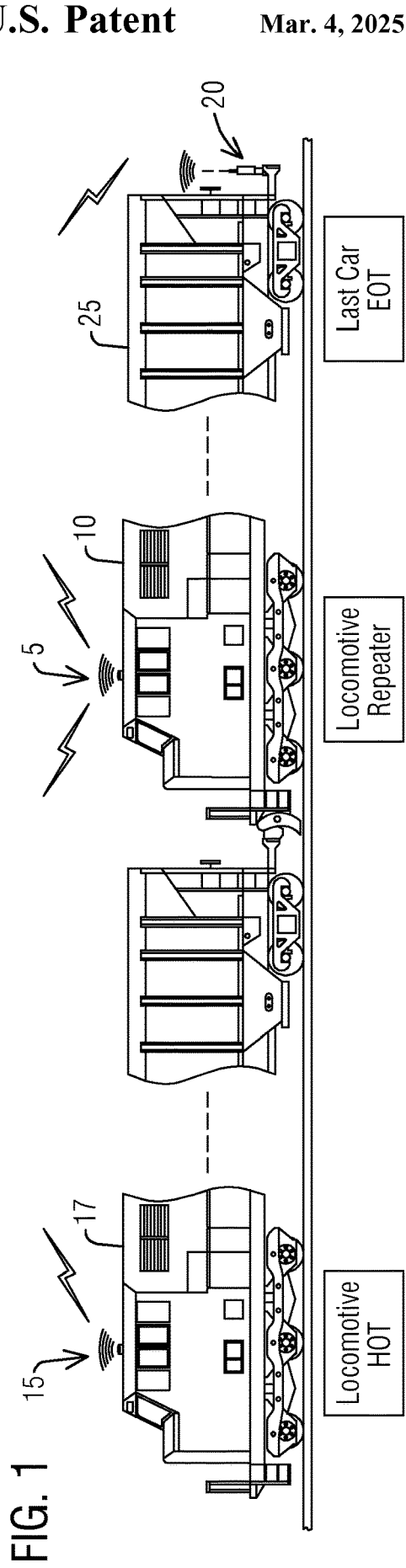
FIG. 1 illustrates a schematic of a known HOT repeater device installed on a locomotive to bridge communications between a HOT device installed in the locomotive and an EOT device installed on a last car.

FIG. 1 represents a schematic of a known HOT repeater device 5 installed on a locomotive 10 to bridge communications between a HOT device 15 installed in a locomotive 17 and an EOT device 20 installed on a last car 25. However, this solution requires running distributive power (DP) trains with an additional locomotive 10 located in the middle of a train 30. This design is not optimal as it requires running DP-equipped trains with a specific train consist configuration.

Figure 2:
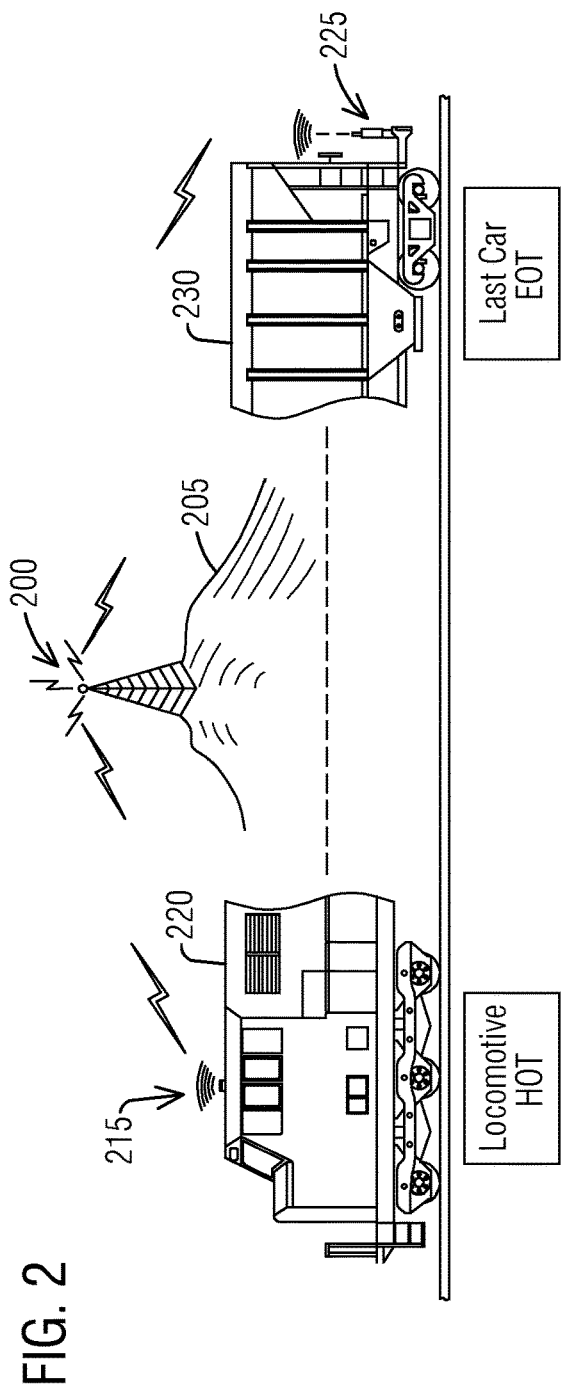
FIG. 2 illustrates a schematic of a known land-based repeater device installed on a geographic impediment to bridge communications between a HOT device installed in the locomotive and an EOT device installed on a last car.

Referring to FIG. 2, it illustrates a schematic of a known land-based repeater device 200 installed on a geographic impediment 205 to bridge communications between a HOT device 215 installed in a locomotive 220 and an EOT device 225 installed on a last car 230. Land-based repeater devices may be used where known geographic impediments are located. Examples of geographic impediments include tunnels, tight curves, and mountainous terrain. However, this solution requires high infrastructure investment and maintenance. Moreover, it is effective only in the vicinity of the location where the repeater device is installed. Also this approach does not offer an overall solution for running longer trains.

Turning now to FIG. 3, it illustrates a schematic of a MOT mobile unit 300 as a train-based solution to bridge communications between a HOT device 305 installed in a locomotive 310 and an EOT device 315 installed on a last car 320 of a train 325 consistent with one embodiment of the present invention. The MOT mobile unit 300 is an EOT-like device placed in or near the middle of the train 325. The MOT mobile unit 300 is installed between first and second railway cars 330(1-2) and it operates as a repeater device. As the repeater device, the MOT mobile unit 300 bridges communications between the HOT device 305 and the EOT device 315. The MOT mobile unit 300 has all the same basic characteristics of the EOT device 315 but acts as a repeater device without the need for the train 325 to have a locomotive located in the middle. The MOT mobile unit 300 is a train-based solution that can be applied to all train consist lengths and configurations of trains longer than 2 miles.

FIG. 4 illustrates a schematic of a MOT mobile unit 400 with brake-pipe venting in a middle 405 of a train 410 to bridge communications between a HOT device 415 installed in a locomotive 420 and an EOT device 425 installed on a last car 430 in accordance with an exemplary embodiment of the present invention. The MOT mobile unit 400 may provide an additional brake-pipe exhaust point 435 in the middle 405 of the train 410. Such brake-pipe venting now available in the middle 405 of the train 410 helps to improve emergency braking performance. For example, it results in an increased emergency braking reliability and performance. When the HOT device 415 transmits or broadcasts an emergency command, the MOT mobile unit 400 repeats that to send a repeated emergency command to the EOT device 425.

Figure 5:
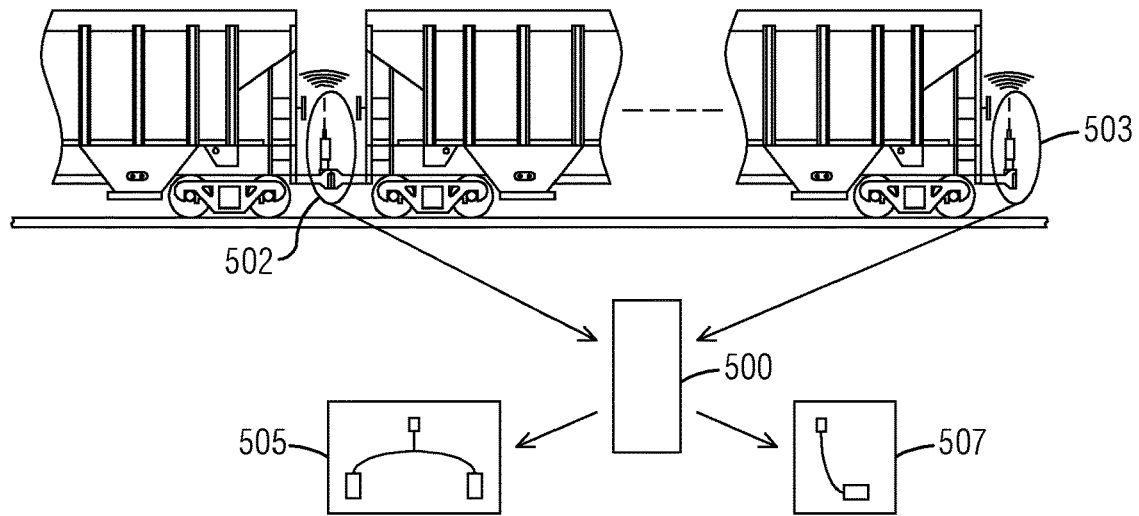
FIG. 5 illustrates a train device that is user configurable to operate as an EOT unit or a MOT mobile unit according to an exemplary embodiment of the present invention.

As seen in FIG. 5, it illustrates a combined train device 500 that is user configurable to operate as an EOT unit or a MOT mobile unit according to an exemplary embodiment of the present invention. MOTs and EOTs may be deployed, managed, tracked and maintained in exactly the same way. In fact the combined train device 500 is designed to be used as a MOT mobile unit or an EOT unit, with a simple conversion between the two. The combined train device 500 is user-configurable to operate as EOT or MOT. To configure as a MOT mobile unit 502 a pass-through T-hose 505 is selected and to configure as an EOT unit 503 a single end-hose 507 is selected.

Figure 6:
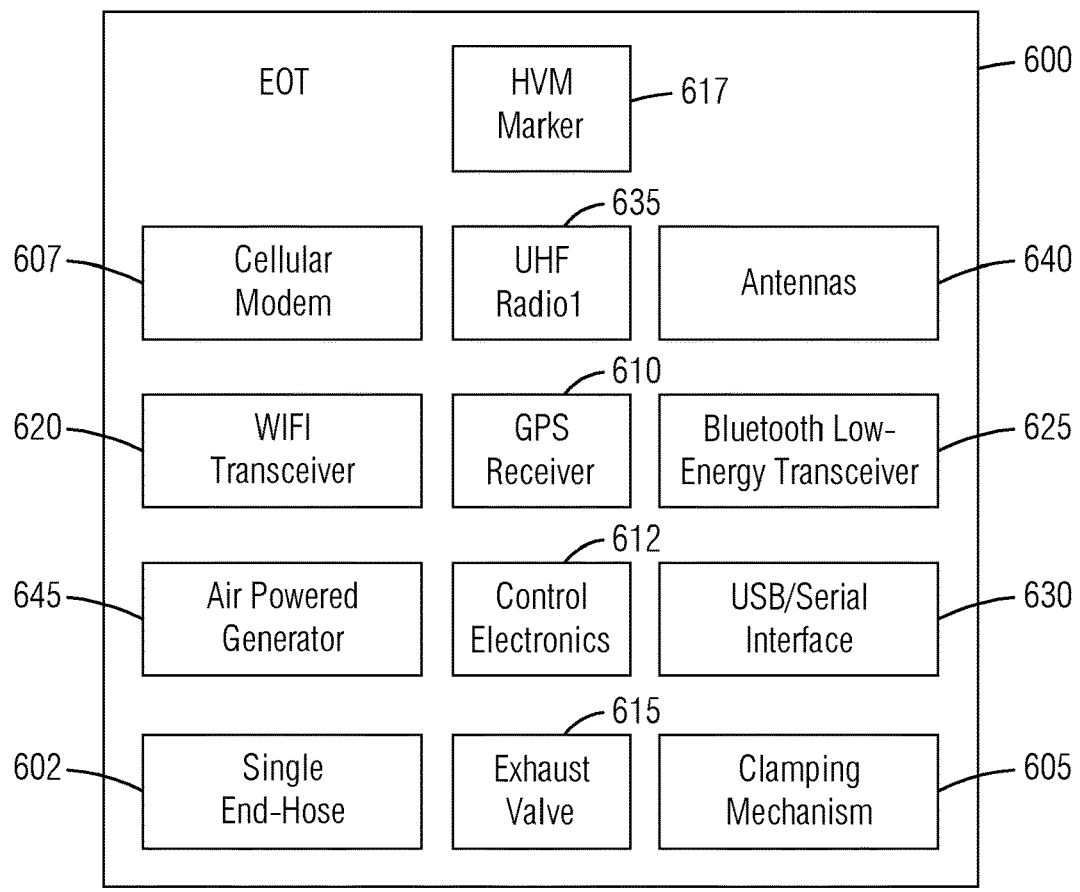
FIG. 6 illustrates a schematic block diagram of an EOT unit according to an exemplary embodiment of the present invention.

As shown in FIG. 6, it illustrates a schematic block diagram of an EOT unit 600 according to an exemplary embodiment of the present invention. The EOT unit 600 comprises a single end-hose 602 to couple to the last car 320 of the train 325. The EOT unit 600 further comprises a clamping mechanism 605 that provides a mechanical interface to removably attach to the train 325 onto a car set at a coupler, a knuckle, a frame, or a ladder.

The EOT unit 600 further comprises a cellular modem 607 for remote reporting to a central server. The EOT unit 600 further comprises a Global Positioning System (GPS) receiver 610 and control electronics 612 for logic control of all device functionality of the EOT unit 600. The EOT unit 600 further comprises an emergency exhaust valve 615 for emergency activation. The EOT unit 600 further comprises a high visibility marker (HVM) 617 to provide a flashing light indication of an end of the train 325.

The EOT unit 600 further comprises a Wi-Fi transceiver 620 for local and remote user interface. The EOT unit 600 further comprises a Bluetooth low-energy transceiver 625 for local user interface and a USB/Serial interface 630 for local user interface. The EOT unit 600 further comprises a first radio (e.g., UHF Radio 1) 635 and antennas 640. The EOT unit 600 further comprises an air powered generator 645.

Figure 7:
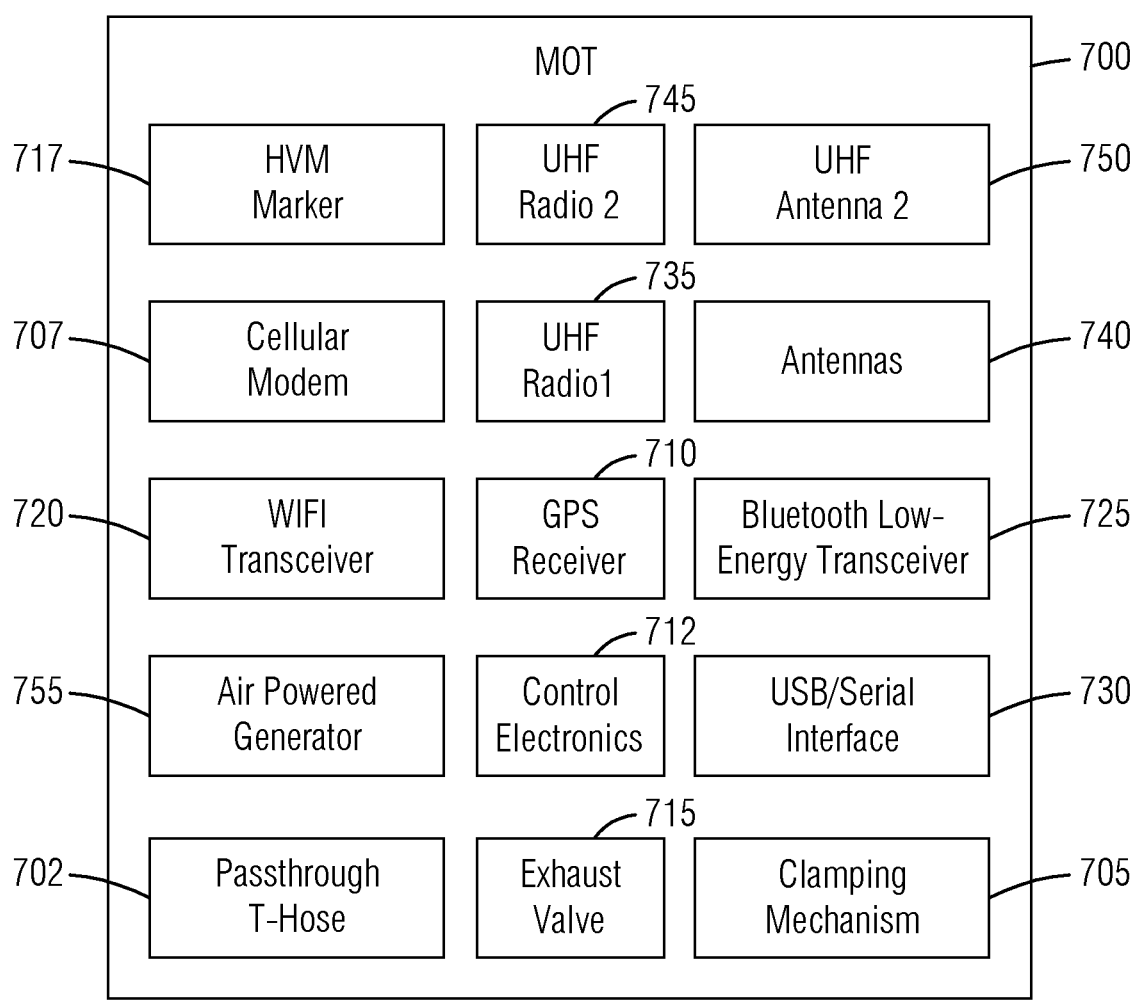
FIG. 7 illustrates a schematic block diagram of a MOT mobile unit according to an exemplary embodiment of the present invention.

In FIG. 7, it illustrates a schematic block diagram of a MOT mobile unit 700 according to an exemplary embodiment of the present invention. The MOT mobile unit 700 comprises a pass-through T-hose 702 for mounting the MOT mobile unit 700 between the first and second railway cars 330(1-2) of the train 325 located near a middle of the train 325. The MOT mobile unit 700 further comprises a clamping mechanism 705 that provides a mechanical interface to removably attach to the train 325 onto a car set at a coupler, a knuckle, a frame, or a ladder.

The MOT mobile unit 700 further comprises a cellular modem 707 for remote reporting to a central server. The MOT mobile unit 700 further comprises a Global Positioning System (GPS) receiver 710 and control electronics 712 for logic control of all device functionality of the MOT mobile unit 700. The MOT mobile unit 700 further comprises an emergency exhaust valve 715 for emergency activation. The MOT mobile unit 700 further comprises a high visibility marker (HVM) 717 to provide a flashing light indication of an end of the train 325.

The MOT mobile unit 700 further comprises a Wi-Fi transceiver 720 for local and remote user interface. The MOT mobile unit 700 further comprises a Bluetooth low-energy transceiver 725 for local user interface and a USB/Serial interface 730 for local user interface. The MOT mobile unit 700 further comprises a first radio (e.g., UHF Radio 1) 735 and antennas 740. The first radio 735 is for communications with an end of train (EOT) unit disposed on one end of the train 325.

The MOT mobile unit 700 further comprises a second radio (e.g., UHF Radio 2) 745 and an antenna 750 (e.g., UHF antenna 2). The antenna 750 may include a telescopic antenna for the second radio 745 to reach above the car set to aid in a communication between the HOT unit (e.g., the HOT device 305 installed in the locomotive 310) and the EOT unit (e.g., the EOT device 315). The second radio 745 is for communications with a head of train (HOT) unit disposed on other end of the train 325. With the first and second radios 735, 745 jointly the MOT mobile unit 700 provides a repeater device functionality for communicating between the EOT unit (e.g., the EOT device 315) and the HOT unit (e.g., the HOT device 305 installed in the locomotive 310).

The MOT mobile unit 700 further comprises an air-powered generator 755. The MOT mobile unit 700 is configured to receive a power from a brake line of the train 325 that runs a length of the train 325. The power is derived from a compressed air in the brake line by means of the air-powered generator 755 that recharges a battery.

Figure 8:
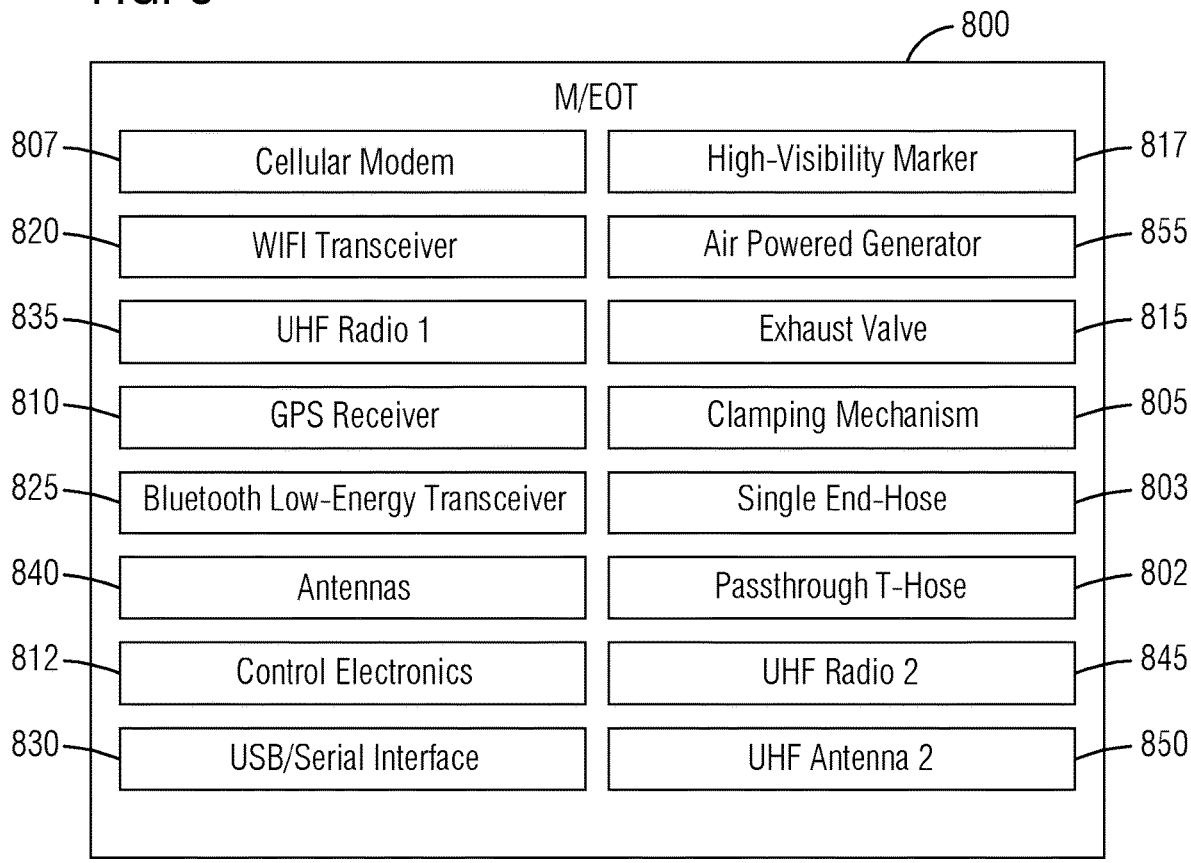
FIG. 8 illustrates a schematic block diagram of a combined configurable EOT unit/MOT mobile unit according to an exemplary embodiment of the present invention.

With regard to FIG. 8, it illustrates a schematic block diagram of a combined configurable EOT unit/MOT mobile unit 800 according to an exemplary embodiment of the present invention. The combined configurable EOT unit/MOT mobile unit 800 comprises a pass-through T-hose 802 for mounting the combined configurable EOT unit/MOT mobile unit 800 between the first and second railway cars 330(1-2) of the train 325 located near a middle of the train 325. The combined configurable EOT unit/MOT mobile unit 800 comprises a single end-hose 803 to couple to the last car 320 of the train 325 such that the combined configurable EOT unit/MOT mobile unit 800 is user configurable with the single end-hose 803 to operate as the EOT unit instead of the MOT mobile unit. The combined configurable EOT unit/MOT mobile unit 800 further comprises a clamping mechanism 805 that provides a mechanical interface to removably attach to the train 325 onto a car set at a coupler, a knuckle, a frame, or a ladder.

The combined configurable EOT unit/MOT mobile unit 800 further comprises a cellular modem 807 for remote reporting to a central server. The combined configurable EOT unit/MOT mobile unit 800 further comprises a Global Positioning System (GPS) receiver 810 and control electronics 812 for logic control of all device functionality of the combined configurable EOT unit/MOT mobile unit 800. The combined configurable EOT unit/MOT mobile unit 800 further comprises an emergency exhaust valve 815 for emergency activation. The combined configurable EOT unit/MOT mobile unit 800 further comprises a high visibility marker (HVM) 817 to provide a flashing light indication of an end of the train 325.

The combined configurable EOT unit/MOT mobile unit 800 further comprises a Wi-Fi transceiver 820 for local and remote user interface. The combined configurable EOT unit/MOT mobile unit 800 further comprises a Bluetooth low-energy transceiver 825 for local user interface and a USB/Serial interface 830 for local user interface. The combined configurable EOT unit/MOT mobile unit 800 further comprises a first radio (e.g., UHF Radio 1) 835 and antennas 840. The first radio 835 is for communications with an end of train (EOT) unit disposed on one end of the train 325.

The combined configurable EOT unit/MOT mobile unit 800 further comprises a second radio (e.g., UHF Radio 2) 845 and an antenna 850 (e.g., UHF antenna 2). The antenna 850 may include a telescopic antenna for the second radio 845 to reach above the car set to aid in a communication between the HOT unit (e.g., the HOT device 305 installed in the locomotive 310) and the EOT unit (e.g., the EOT device 315). The second radio 845 is for communications with a head of train (HOT) unit disposed on other end of the train 325. With the first and second radios 835, 845 jointly the combined configurable EOT unit/MOT mobile unit 800 provides a repeater device functionality for communicating between the EOT unit (e.g., the EOT device 315) and the HOT unit (e.g., the HOT device 305 installed in the locomotive 310).

The combined configurable EOT unit/MOT mobile unit 800 further comprises an air-powered generator 855. The combined configurable EOT unit/MOT mobile unit 800 is configured to receive a power from a brake line of the train 325 that runs a length of the train 325. The power is derived from a compressed air in the brake line by means of the air-powered generator 855 that recharges a battery.

Figure 9:
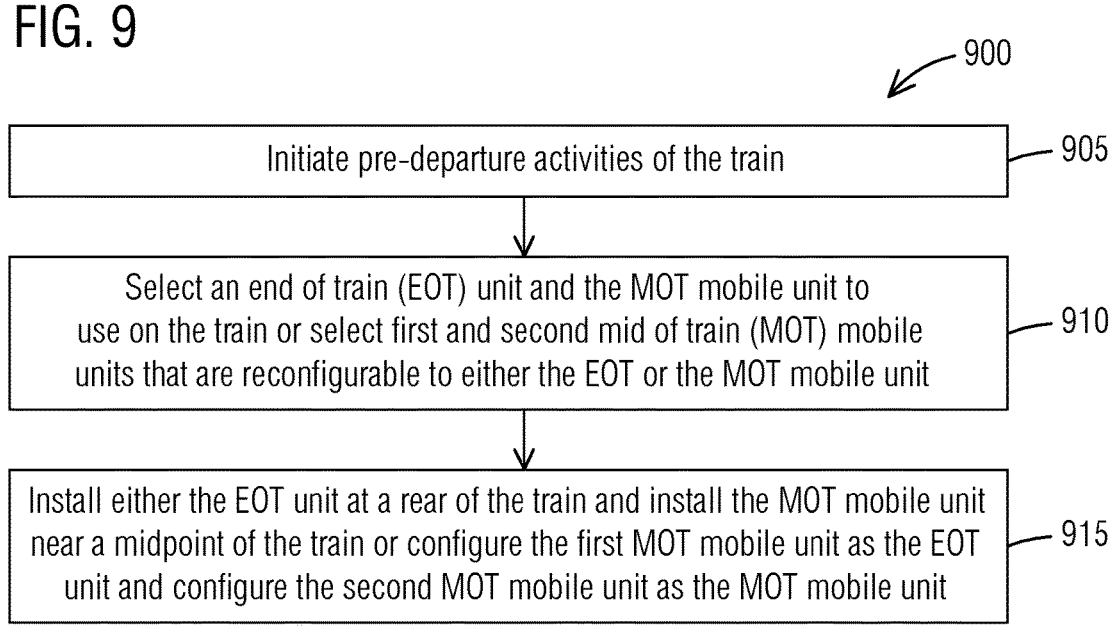
FIG. 9 illustrates a flow chart of a method of installing a MOT mobile unit according to an exemplary embodiment of the present invention.

With respect to FIG. 9, it illustrates a flow chart of a method 900 of installing the MOT mobile unit 300, 400, 700, 800 according to an exemplary embodiment of the present invention. Reference is made to the elements and features described in FIGS. 3-8. It should be appreciated that some steps are not required to be performed in any particular order, and that some steps are optional.

The method 900, in step 905, includes initiating pre-departure activities of the train 325. The method 900, in step 910, further includes selecting an end of train (EOT) unit and the MOT mobile unit to use on the train or selecting first and second mid of train (MOT) mobile units that are reconfigurable to either the EOT or the MOT mobile unit. The method 900, in step 915, further includes installing either the EOT unit at a rear of the train 325 and installing the MOT mobile unit near a midpoint of the train 325 or configuring the first MOT mobile unit as the EOT unit and configuring the second MOT mobile unit as the MOT mobile unit.

Figure 10:
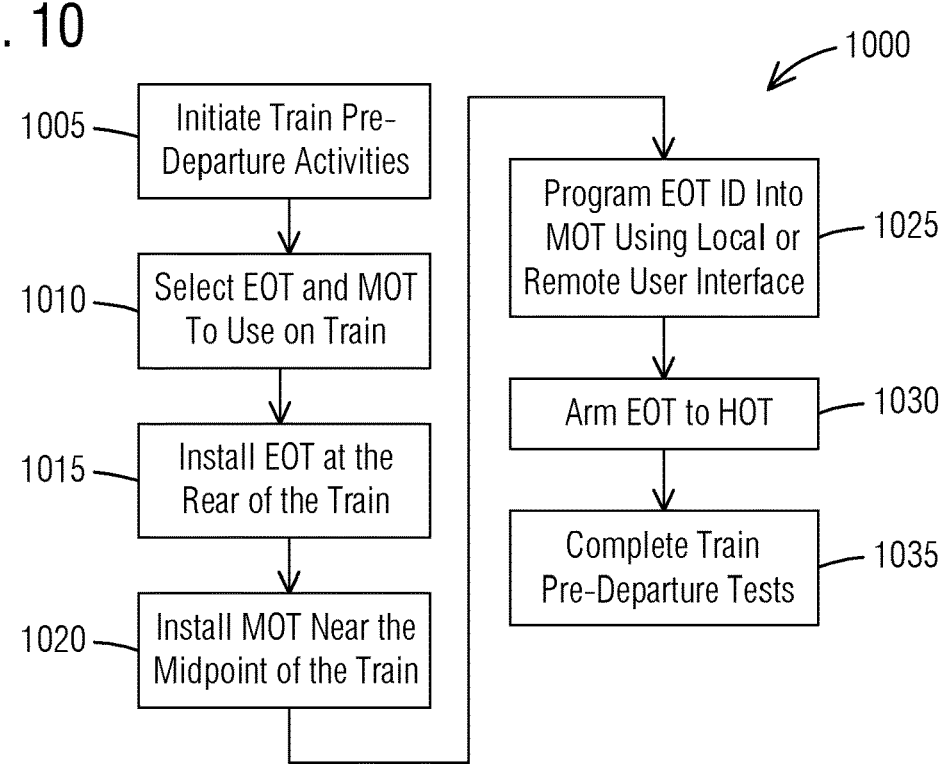
FIG. 10 illustrates a flow chart of a method of installing the EOT unit and the MOT mobile unit as separate, dedicated devices in which marrying of the EOT unit and the MOT mobile unit is done after taking the two devices to the train according to an exemplary embodiment of the present invention.

FIG. 10 illustrates a flow chart of a method 1000 of installing the EOT unit (e.g., the EOT device 315) and the MOT mobile unit 300, 700 as separate, dedicated devices in which marrying of the EOT unit and the MOT mobile unit 300 is done after taking the two devices to the train 325 according to an exemplary embodiment of the present invention. Reference is made to the elements and features described in FIGS. 3-8. It should be appreciated that some steps are not required to be performed in any particular order, and that some steps are optional.

The method 1000, in step 1005, includes initiating pre-departure activities of the train 325. The method 1000, in step 1010, further includes selecting the EOT unit (e.g., the EOT device 315) and the MOT mobile unit 300 to use on the train 325. The method 1000, in step 1015, further includes installing the EOT unit at the rear of the train 325. The method 1000, in step 1020, further includes installing the MOT mobile unit 300 near the midpoint of the train 325. Installation on the train 325 includes coupling of air hoses (single end-hose connection for the EOT unit at the last car and pass-through T-hose connection for the MOT mobile unit 300 between two railway cars).

The method 1000, in step 1025, further includes programming an EOT ID into the MOT mobile unit 300 using local or remote user interfaces. The method 1000, in step 1030, further includes arming the EOT unit to a HOT unit (e.g., the HOT device 305 installed in the locomotive 310). The method 1000, in step 1035, further includes completing train pre-departure tests.

Figure 11:
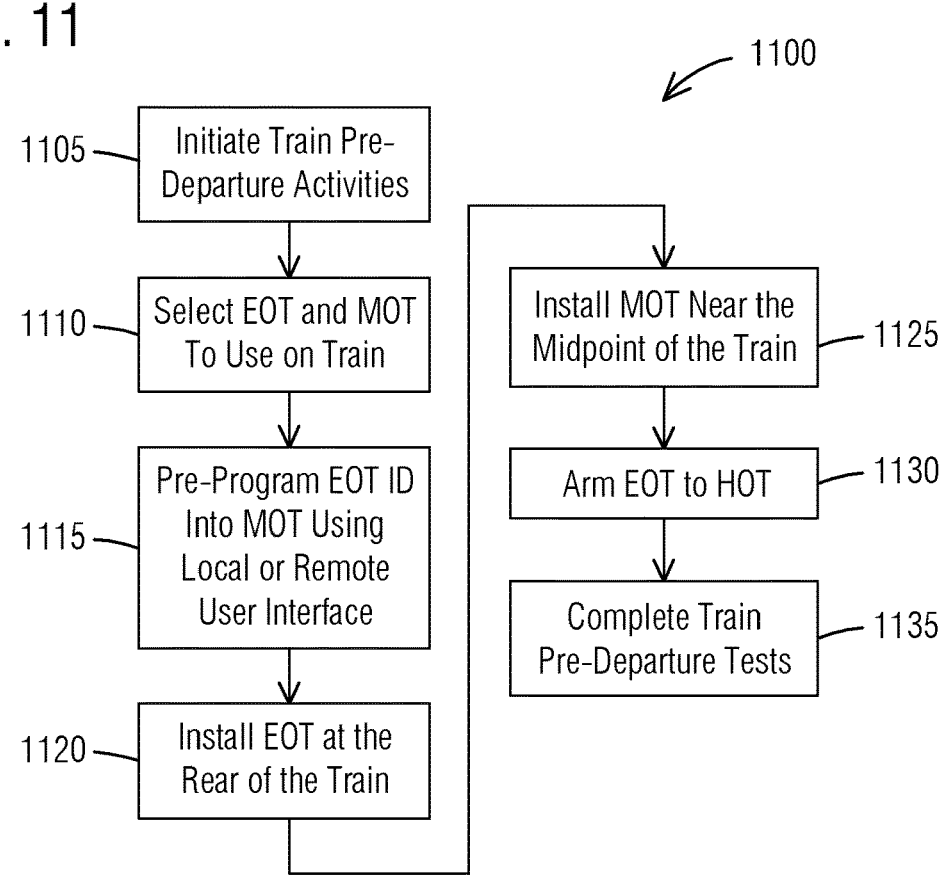
FIG. 11 illustrates a flow chart of a method of installing the EOT unit and the MOT mobile unit as separate, dedicated devices in which marrying of the EOT unit and the MOT mobile unit is done before taking the two devices to the train according to an exemplary embodiment of the present invention.

FIG. 11 illustrates a flow chart of a method 1100 of installing the EOT unit (e.g., the EOT device 315) and the MOT mobile unit 300, 700 as separate, dedicated devices in which marrying of the EOT unit and the MOT mobile unit 300 is done before taking the two devices to the train 325 according to an exemplary embodiment of the present invention. Reference is made to the elements and features described in FIGS. 3-8. It should be appreciated that some steps are not required to be performed in any particular order, and that some steps are optional.

The method 1100, in step 1105, includes initiating pre-departure activities of the train 325. The method 1100, in step 1110, further includes selecting the EOT unit (e.g., the EOT device 315) and the MOT mobile unit 300 to use on the train 325. The method 1100, in step 1115, further includes programming an EOT ID into the MOT mobile unit 300 using local or remote user interfaces.

The method 1100, in step 1120, further includes installing the EOT unit at the rear of the train 325. The method 1100, in step 1125, further includes installing the MOT mobile unit 300 near the midpoint of the train 325. Installation on the train 325 includes coupling of air hoses (single end-hose connection for the EOT unit at the last car and pass-through T-hose connection for the MOT mobile unit 300 between two railway cars).

The method 1100, in step 1130, further includes arming the EOT unit to a HOT unit (e.g., the HOT device 305 installed in the locomotive 310). The method 1100, in step 1135, further includes completing train pre-departure tests.

Figure 12:
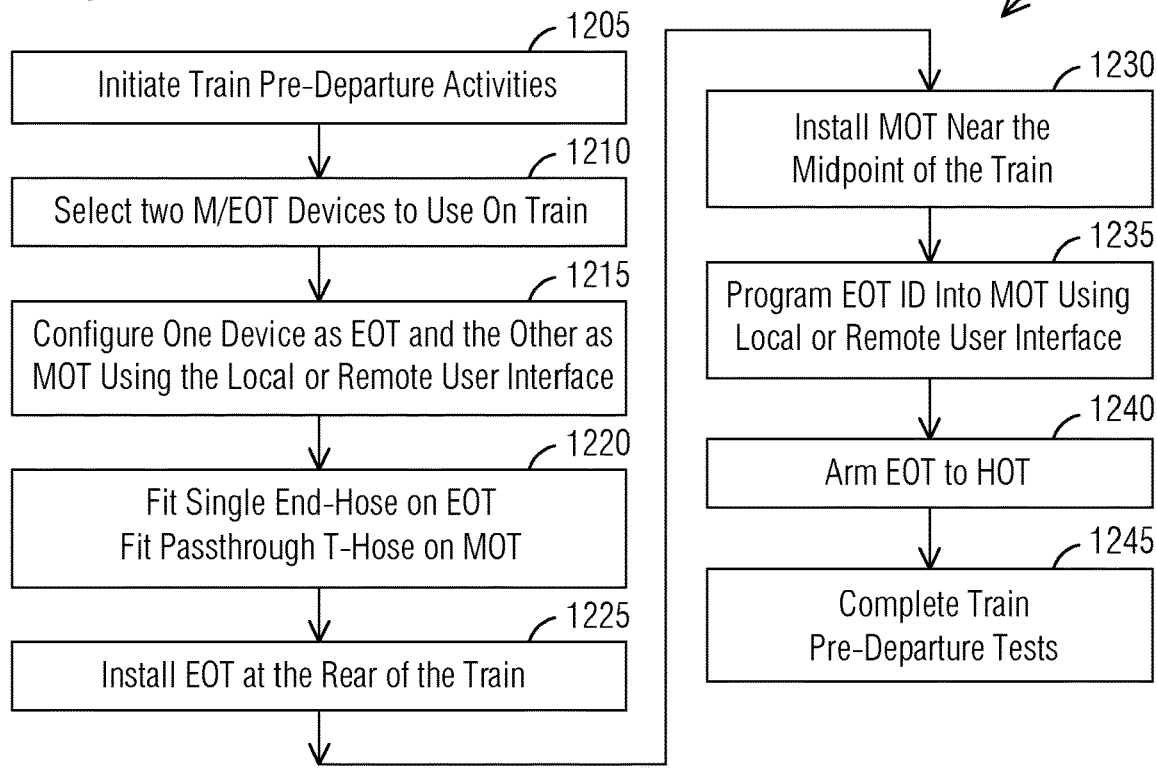
FIG. 12 illustrates a flow chart of a method of installing the EOT unit and the MOT mobile unit as a combined configurable device in which marrying of the EOT unit and the MOT mobile unit is done after taking the two devices to the train according to an exemplary embodiment of the present invention.

FIG. 12 illustrates a flow chart of a method 1200 of installing the EOT unit (e.g., the EOT device 315) and the MOT mobile unit 800 as a combined configurable device in which marrying of the EOT unit and the MOT mobile unit 800 is done after taking the two devices to the train 325 according to an exemplary embodiment of the present invention. Reference is made to the elements and features described in FIGS. 3-8. It should be appreciated that some steps are not required to be performed in any particular order, and that some steps are optional.

The method 1200, in step 1205, includes initiating pre-departure activities of the train 325. The method 1200, in step 1210, further includes selecting two M/EOT devices (e.g., the MOT mobile unit 800) to use on the train 325. The method 1200, in step 1215, further includes configuring one M/EOT device as the EOT unit and the other as the MOT mobile unit using the local or remote user interfaces. The method 1200, in step 1220, further includes fitting the single end-hose on the EOT unit and fitting the pass-through T-hose on the MOT mobile unit.

The method 1200, in step 1225, further includes installing the EOT unit at the rear of the train 325. The method 1200, in step 1230, further includes installing the MOT mobile unit near the midpoint of the train 325. Installation on the train 325 includes coupling of air hoses (single end-hose connection for the EOT unit at the last car and pass-through T-hose connection for the MOT mobile unit between two railway cars).

The method 1200, in step 1235, further includes programming an EOT ID into the MOT mobile unit 300 using local or remote user interfaces. The method 1200, in step 1240, further includes arming the EOT unit to a HOT unit (e.g., the HOT device 305 installed in the locomotive 310). The method 1200, in step 1245, further includes completing train pre-departure tests.

Figure 13:
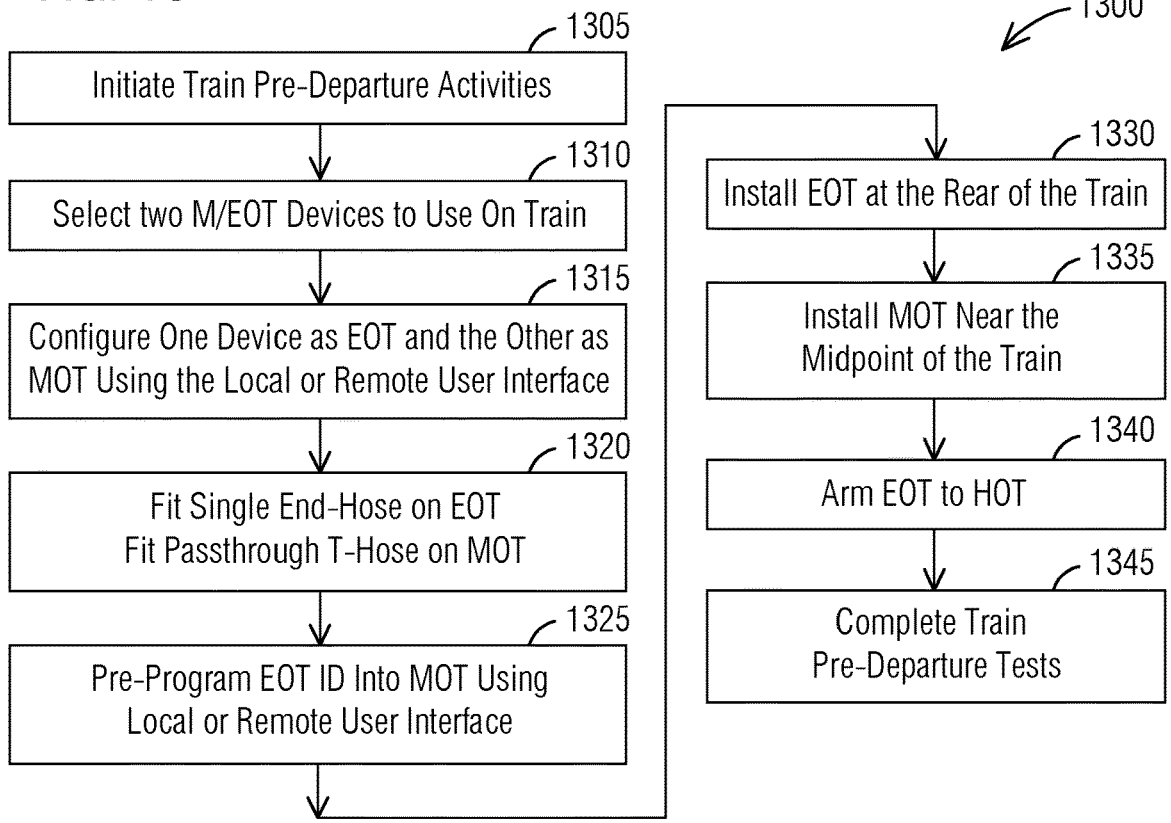
FIG. 13 illustrates a flow chart of a method of installing the EOT unit and the MOT mobile unit as a combined configurable device in which marrying of the EOT unit and the MOT mobile unit is done after taking the two devices to the train according to an exemplary embodiment of the present invention.

FIG. 13 illustrates a flow chart of a method 1300 of installing the EOT unit (e.g., the EOT device 315) and the MOT mobile unit 800 as a combined configurable device in which marrying of the EOT unit and the MOT mobile unit 800 is done after taking the two devices to the train 325 according to an exemplary embodiment of the present invention. Reference is made to the elements and features described in FIGS. 3-8. It should be appreciated that some steps are not required to be performed in any particular order, and that some steps are optional.

The method 1300, in step 1305, includes initiating pre-departure activities of the train 325. The method 1300, in step 1310, further includes selecting two M/EOT devices (e.g., the MOT mobile unit 800) to use on the train 325. The method 1300, in step 1315, further includes configuring one M/EOT device as the EOT unit and the other as the MOT mobile unit using the local or remote user interfaces. The method 1300, in step 1320, further includes fitting the single end-hose on the EOT unit and fitting the pass-through T-hose on the MOT mobile unit.

The method 1300, in step 1325, further includes programming an EOT ID into the MOT mobile unit 300 using local or remote user interfaces. The method 1300, in step 1330, further includes installing the EOT unit at the rear of the train 325. The method 1300, in step 1335, further includes installing the MOT mobile unit near the midpoint of the train 325. Installation on the train 325 includes coupling of air hoses (single end-hose connection for the EOT unit at the last car and pass-through T-hose connection for the MOT mobile unit between two railway cars).

The method 1300, in step 1340, further includes arming the EOT unit to a HOT unit (e.g., the HOT device 305 installed in the locomotive 310). The method 1300, in step 1345, further includes completing train pre-departure tests.

In this way, the MOT mobile unit 300 connected between two railway cars via a pass-through T-hose connection repeats or re-broadcasts a communication from the HOT unit or device to the EOT unit or device and vice versa via a radio-based telemetry link. Telemetry radios such as microwave wireless (UHF, VHF) may be used for an automated communications process by which measurements and other data are collected at remote or inaccessible points and transmitted to receiving equipment for monitoring. Any suitable telemetry link based on industry communication protocols may be used with specific radios. Although a telemetry link commonly refers to wireless data transfer mechanisms (e.g., using radio, ultrasonic, or infrared systems), it also encompasses data transferred over other media such as a telephone or computer network, optical link or other wired communications like power line carriers. Accordingly, the MOT mobile unit 300 enables a locomotive-train operating control system for controlling the trains via a HOT+MOT+EOT link and a EOT+MOT+HOT link.

The MOT mobile unit 800 may be configured via a cable link or Wi-Fi using a computer or a mobile device via an application (APP) or via a hand-held device using a Bluetooth link. The computer may be connected to a server via the Internet. The computer may provide a setting screen to reconfigure the MOT mobile unit 800.

Figure 14:
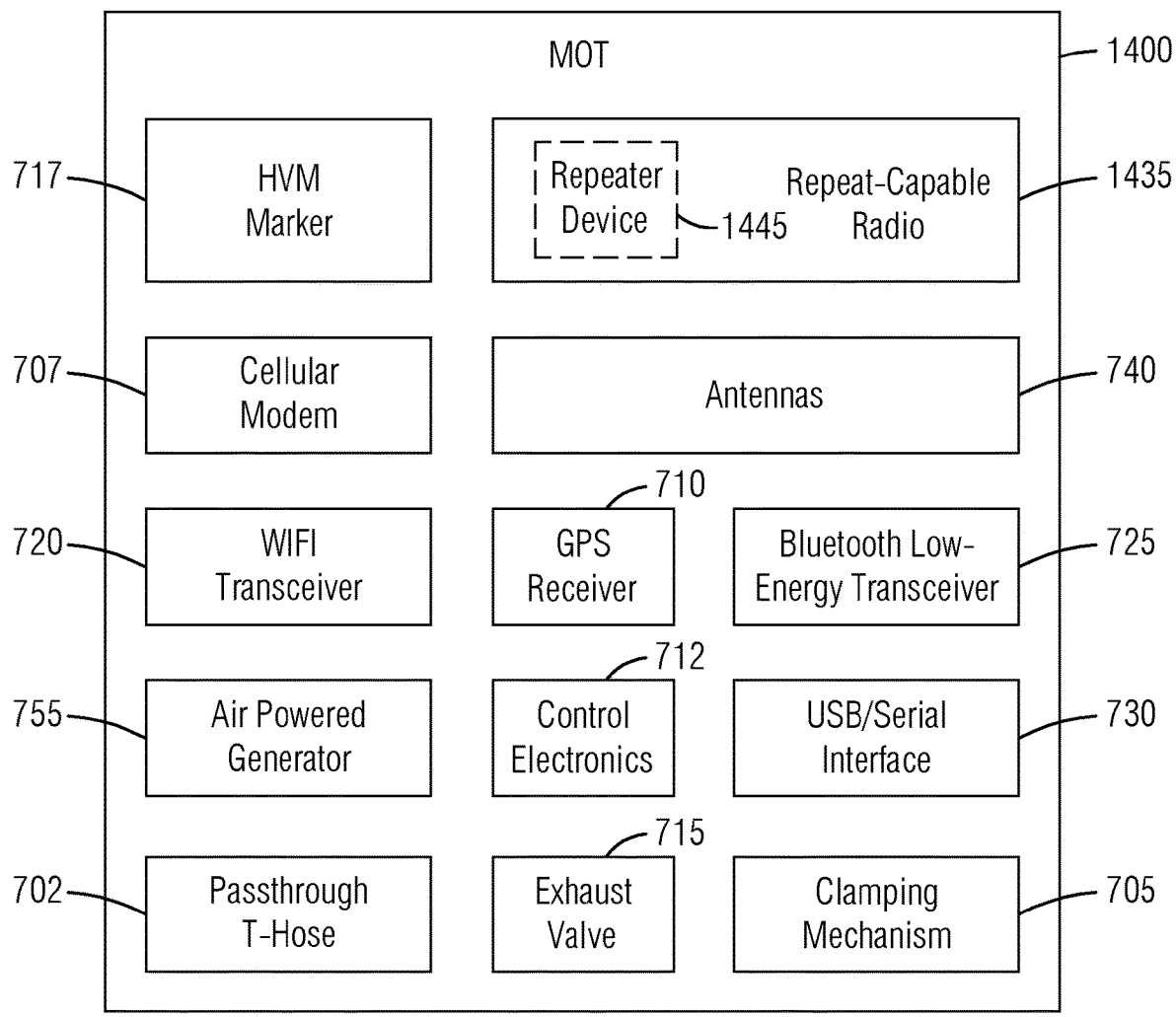
FIG. 14 illustrates a schematic block diagram of a MOT mobile unit according to an exemplary embodiment of the present invention.

FIG. 14 illustrates a schematic block diagram of a MOT mobile unit 1400 according to another embodiment of the present invention. The MOT mobile unit 1400 further comprises a repeat-capable radio (e.g., UHF Radio) 1435. The radio 1435 comprises a repeater device 1445. With the radio 1435, the MOT mobile unit 1400 provides a repeater device functionality for communicating between the EOT device or unit 315 and the HOT device or unit 305 (see FIG. 3). The EOT unit 315 transmits on a frequency F1, and the HOT unit 305 transmits on a frequency F2 such that the repeat-capable radio 1435 monitors both the frequency F1 and the frequency F2 simultaneously, looking for messages from either the HOT unit 305 or the EOT unit 315 that are to be repeated. Upon detection of a message, the repeat-capable radio 1435 will store and repeat the message. The radio 1435 will be constantly bouncing back and forth between the frequency F1 and the frequency F2, looking for a message preamble of a message on either frequency and when the message preamble (a bit sync pattern) is recognized, the repeat-capable radio 1435 will stay on that channel to complete the reception of the message and it will subsequently repeat the message.

Figure 15:
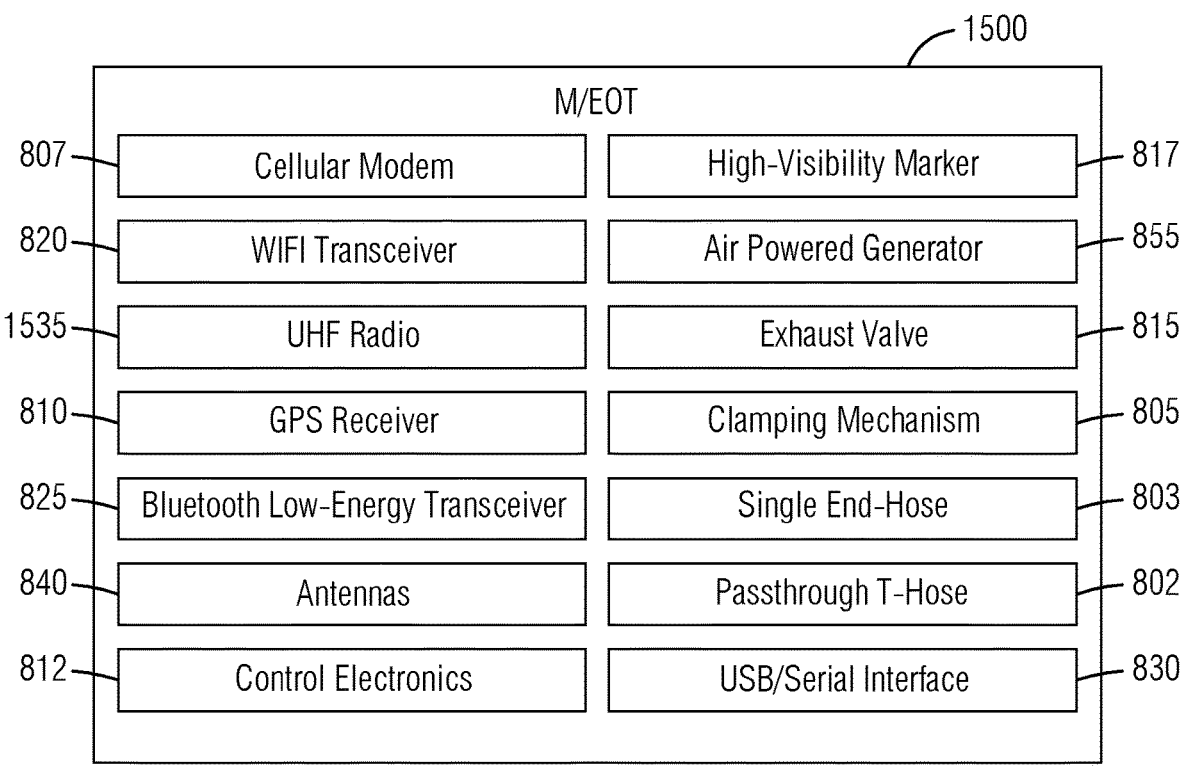
FIG. 15 illustrates a schematic block diagram of a combined configurable EOT unit/MOT mobile unit according to an exemplary embodiment of the present invention.

FIG. 15 illustrates a schematic block diagram of a combined configurable EOT unit/MOT mobile unit 1500 according to another embodiment of the present invention. The combined configurable EOT unit/MOT mobile unit 1500 further comprises a radio (e.g., UHF Radio) 1535. With the radio 1535, the configurable EOT unit/MOT mobile unit 1500 provides a repeater device functionality for communicating between the EOT device or unit 315 and the HOT device or unit 305 (see FIG. 3).

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A mid of train (MOT) mobile unit for use with a train, the MOT mobile unit comprising:
    a first hose for mounting the MOT mobile unit between first and second railway cars of the train located near a middle of the train;
    a first radio for communications with an end of train (EOT) unit disposed on one end of the train; and
    a second radio for communications with a head of train (HOT) unit disposed on other end of the train, wherein with the first and second radios jointly the MOT mobile unit provides a repeater device functionality for communicating between the EOT unit and the HOT unit,
    wherein the MOT mobile unit is configured to receive a power from a brake line of the train that runs a length of the train, wherein the power is derived from a compressed air in the brake line by means of an air-powered generator that recharges a battery.

2. The MOT mobile unit of claim 1, wherein the first hose is a pass-through T-hose such that the MOT mobile unit is user configurable with the pass-through t-hose to operate as the MOT mobile unit instead of the EOT unit.

3. The MOT mobile unit of claim 1, wherein the MOT mobile unit is configured to attach onto a car set near a middle of the length of the train.

4. The MOT mobile unit of claim 3, further comprising:
    a clamping mechanism that provides a mechanical interface to removably attach to the train onto the car set at a coupler, a knuckle, a frame, or a ladder.

5. The MOT mobile unit of claim 3, further comprising:
    a telescopic antenna for the second radio to reach above the car set to aid in a communication between the HOT unit and the EOT unit.

6. The MOT mobile unit of claim 1, further comprising:
a second hose such that the MOT mobile unit is user configurable with the second hose to operate as the EOT unit instead of the MOT mobile unit.

7. The MOT mobile unit of claim 6, wherein the second hose is a single end-hose to couple to a last car of the train such as to operate the MOT mobile unit as the EOT unit.

8. The MOT mobile unit of claim 1, further comprising:
a cellular modem for remote reporting to a central server;
a Global Positioning System (GPS) receiver;
a control electronics for logic control of all device functionality of the MOT mobile unit;
an emergency exhaust valve for emergency activation; and
a high visibility marker to provide a flashing light indication of an end of the train.

9. The MOT mobile unit of claim 8, further comprising:
a Wi-Fi transceiver for local and remote user interface;
a Bluetooth low-energy transceiver for local user interface; and
a USB/Serial interface for local user interface.

10. The MOT mobile unit of claim 1, wherein the EOT unit transmits on a frequency F1, and the HOT unit transmits on a frequency F2 such that the repeater device monitors both the frequency F1 and the frequency F2 simultaneously, looking for messages from either the HOT unit or the EOT unit that are to be repeated.

11. The MOT mobile unit of claim 10, wherein upon detection of a message by the radio, the repeater device is configured to receive, store and repeat the message.

12. The MOT mobile unit of claim 10, wherein the radio will be constantly bouncing back and forth between the frequency F1 and the frequency F2, looking for a message preamble of a message on either frequency and when the message preamble (a bit sync pattern) is recognized, the repeater device will stay on that channel to complete the reception of the message and it will subsequently repeat the message.

13. The MOT mobile unit of claim 1, wherein the first hose is a pass-through T-hose such that the MOT mobile unit is user configurable with the pass-through t-hose to operate as the MOT mobile unit instead of the EOT unit.

14. The MOT mobile unit of claim 1, wherein the MOT mobile unit is configured to attach onto a car set near a middle of the length of the train.

15. The MOT mobile unit of claim 14, further comprising:
a clamping mechanism that provides a mechanical interface to removably attach to the train onto the car set at a coupler, a knuckle, a frame, or a ladder; and
a single antenna that already exists in an EOT configuration for the radio to aid in a communication between the HOT unit and the EOT unit.

16. A mid of train (MOT) mobile unit for use with a train, the MOT mobile unit comprising:
a pass-through T-hose for mounting the MOT mobile unit between first and second railway cars of the train located near a middle of the train such that the MOT mobile unit is user configurable with the pass-through t-hose to operate as the MOT mobile unit instead of an end of train (EOT) unit;
a single end-hose to couple to a last car of the train such that the MOT mobile unit is user configurable with the single end-hose to operate as the EOT unit instead of the MOT mobile unit;
a first radio for communications with an end of train (EOT) unit disposed on one end of the train; and
a second radio for communications with a head of train (HOT) unit disposed on other end of the train, wherein with the first and second radios jointly the MOT mobile unit provides a repeater device functionality for communicating between the EOT unit and the HOT unit,
wherein the MOT mobile unit is configured to receive a power from a brake line of the train that runs a length of the train, wherein the power is derived from a compressed air in the brake line by means of an air-powered generator that recharges a battery.

17. The MOT mobile unit of claim 16, wherein the MOT mobile unit is configured to attach onto a car set near a middle of the length of the train.

18. The MOT mobile unit of claim 17, further comprising:
a clamping mechanism that provides a mechanical interface to removably attach to the train onto the car set at a coupler, a knuckle, a frame, or a ladder.

19. The MOT mobile unit of claim 18, further comprising:
a telescopic antenna for the second radio to reach above the car set to aid in a communication between the HOT unit and the EOT unit.

20. A mid of train (MOT) mobile unit for use with a train, the MOT mobile unit comprising:
a first hose for mounting the MOT mobile unit between first and second railway cars of the train located near a middle of the train;
a radio for communications with an end of train (EOT) unit disposed on one end of the train and for communications with a head of train (HOT) unit disposed on other end of the train,
wherein with the radio the MOT mobile unit provides a repeater device functionality for communicating between the EOT unit and the HOT unit, and
wherein the MOT mobile unit is configured to receive a power from a brake line of the train that runs a length of the train, wherein the power is derived from a compressed air in the brake line by means of an air-powered generator that recharges a battery.

* * * * *